United States Patent
Marlowe

(10) Patent No.: US 12,229,093 B2
(45) Date of Patent: Feb. 18, 2025

(54) GRAPHICAL USER INTERFACE AND ERROR DETECTION SYSTEM FOR ANALYZING BIG DATASETS

(71) Applicant: Acuitive Solutions, LLC, Charlotte, NC (US)

(72) Inventor: Phillip Marlowe, Weddington, NC (US)

(73) Assignee: Acuitive Solutions, LLC, Charlotte, NC (US)

( * ) Notice: Subject to any disclaimer, the term of this patent is extended or adjusted under 35 U.S.C. 154(b) by 123 days.

(21) Appl. No.: 17/956,987

(22) Filed: Sep. 30, 2022

(65) Prior Publication Data

US 2023/0107253 A1   Apr. 6, 2023

Related U.S. Application Data

(60) Provisional application No. 63/251,181, filed on Oct. 1, 2021.

(51) Int. Cl.
 *G06F 17/00* (2019.01)
 *G06F 16/215* (2019.01)
 *G06F 16/28* (2019.01)

(52) U.S. Cl.
 CPC .......... *G06F 16/215* (2019.01); *G06F 16/287* (2019.01)

(58) Field of Classification Search
 CPC .... G06F 16/215; G06F 16/287; G06Q 10/087
 See application file for complete search history.

(56) References Cited

U.S. PATENT DOCUMENTS 7,272,776 B2 * 9/2007 Kalthoff ................ G06F 16/215
  714/54
8,498,948 B2 * 7/2013 Huang ................. G06V 10/765
  382/187

OTHER PUBLICATIONS

J. R. Pansare and V. D. Bajad. Errors Detection in Big Sensor Data on Cloud using Time Efficient Technique. In Proceedings of the ACM Symposium on Women in Research 2016. Association for Computing Machinery, 12-14. <https://doi.org/10.1145/2909067.2909071>, Mar. 2016.*

* cited by examiner

*Primary Examiner* — Greta L Robinson
(74) *Attorney, Agent, or Firm* — Kilpatrick Townsend & Stockton LLP

(57) ABSTRACT

Errors in big datasets can be automatically detected and output in an interactive graphical user interface (GUI) according to some examples described herein. In one such example, a system includes processing nodes for receiving processing tasks associated with analyzing a dataset (e.g., a big dataset). In response to receiving the processing tasks, the processing nodes can each execute a data-processing module to analyze entries in the dataset based on a predefined set of rules to determine if the entries include one or more types of errors. The data-processing module can then generate processing results indicating whether the entries include at least one type of error. The system can further include a GUI module that is executable to generate a GUI based on the processing results, where the GUI can provide insights about the types of errors present in the dataset for use in resolving said errors.

20 Claims, 12 Drawing Sheets

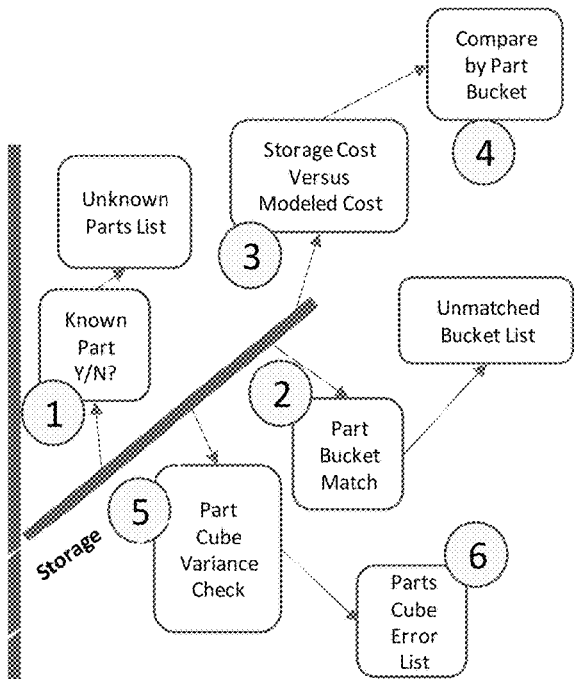

1. Reviewing Storage charge lines to see if the item/part can be validated by the client item/part master. Highlight list of unknown parts and calculate value of unvalidated parts charges.

2. Compare the Product Bucket/Grouping of every Storage charge line Item/Part to validate that the invoiced Bucket is same as what the client specifies. Highlight list of unmatched Bucket items and calculate value of unmatched part charges.

3. Model expected cost of Storage based on the applicable Bucket pricing matrix and compare with invoiced cost per charge line.

4. Calculate variances per charge line and summary display net and ABS variance per Item/Part Bucket.

5. Look up the clients supplied cubic volume per item from the client's item/part master data. Using the Item Quantity and Gross Cube charged derive the average cube per item and compare with the Clients data and calculate the variance.

6. Highlight list of Item/Parts with a cubic volume variance of +/- 3 cft or greater.

FIG. 7

① Review Container Induction charge lines to see if the item/part can be validated by the Inbound International Container data provided by client.

Highlight list of unknown containers and summarize the unvalidated charges.

② Review Container Induction charge lines to see if the Warehouse related to the charge can be validated by the Warehouse related to the Inbound International Container data provided by client. Highlight list of containers with unmated Warehouse ③ Model the expected charges per container based on the client's schedule of charges per warehouse and compare with the invoiced charges.

Calculate and summarize variance per Container induction charge per Matched transactions and Unmatched transactions.

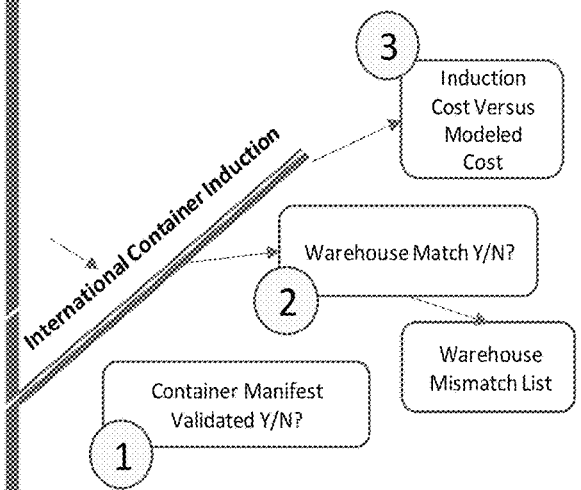

FIG. 8

① Review Domestic Freight Collect charge lines to see if the item/part can be validated by the Inbound International Container data provided by client.

Highlight list of unknown containers and summarize the unvalidated charges.

② Review Domestic Freight Collect charge lines to see if the Warehouse related to the charge can be validated by the Warehouse related to the Inbound International Container data provided by client. Highlight list of containers with unmated Warehouse ③ Model the expected charges per container based on the client's schedule of charges per warehouse and compare with the invoiced charges.

Calculate and summarize variance per Domestic Freight Collect charge per Matched transactions and Unmatched transactions.

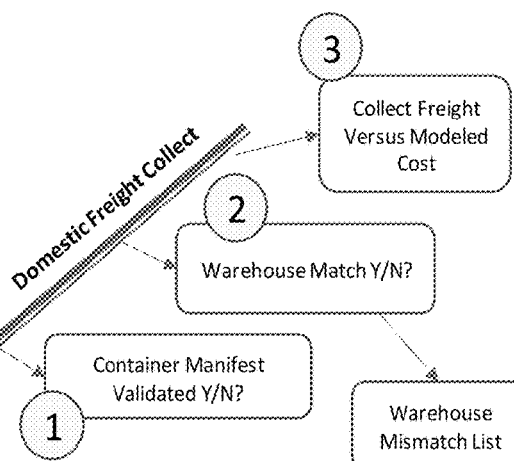

FIG. 9

GRAPHICAL USER INTERFACE AND ERROR DETECTION SYSTEM FOR ANALYZING BIG DATASETS

REFERENCE TO RELATED APPLICATIONS

This application claims the benefit of priority to U.S. Provisional Patent Application No. 63/251,181, filed Oct. 1, 2021, and titled "Graphical User Interface And Error Detection System for Analyzing Big Datasets," which is hereby incorporated by reference herein.

TECHNICAL FIELD

The present disclosure relates generally to graphical user interfaces and systems for big data analysis. More specifically, but not by way of limitation, this disclosure relates to detecting errors in big datasets, which may contain thousands or millions of rows of data, and providing an interactive graphical user interface for exploring the errors.

BACKGROUND

The Internet has made it easier for individuals all over the world to connect with one another, access information, and perform other interactions. But the sheer number and frequency of such interactions has led to numerous challenges that did not exist pre-Internet. For example, prior to the Internet, it may not have been possible for an entity to accept hundreds or thousands of orders concurrently and easily coordinate those orders. The advent of the Internet and distributed computing systems has allowed entities like Amazon®, Wayfair®, and Overstock® to regularly engage in such large numbers of interactions. These interactions can produce massive amounts of data as a byproduct, which did not occur on such a large scale pre-Internet. For example, a single entity may generate significant amounts of data, such as thousands or millions of rows of data, as users browse and interact with the entity's webpage. That data compounds as each day passes. These large datasets are often referred to as "big data." Processing and storing big data may present its own unique set of technical challenges. For example, big data may need to be maintained and processed using sophisticated storage systems, computer systems, and networks, since big data is generally too large or complex to be handled by traditional data-processing software.

SUMMARY

One example of the present disclosure includes a distributed computing system comprising a master node configured to transmit processing tasks to one or more processing nodes. The distributed computing system also comprises the one or more processing nodes. The one or more processing nodes can include one or more processors and one or more non-transitory computer-readable mediums comprising program code that is executable by the one or more processors for causing the one or more processing nodes to perform operations. The operations can include receiving a processing task from the master node. The processing task can involve identifying an error between a first dataset from a first data provider and a second dataset from a second data provider. The first dataset can include a first plurality of details relating to a plurality of physical objects stored or disposed of by the first data provider on behalf of the second data provider during a time period. The second dataset can include a second plurality of details relating to the plurality of physical objects stored or disposed of by the first data provider on behalf of the second data provider during the time period. The first plurality of details can be different from the second plurality of details. The operations can further include executing a data processing module in response to receiving the processing task. The distributed computing system can further include a graphical user interface module that is executable to generate a graphical user interface based on the plurality of processing results. The graphical user interface can be configured to provide insights to the second data provider about one or more types of errors present in the first plurality of details.

The data processing module can be configured to generate a plurality of processing results based on the first plurality of details. To do so, the data processing module can execute one or more validation processes on each entry in the first plurality of details. The validation processes can include determining whether the entry also has a corresponding entry in the second plurality of details and, if the entry does not have the corresponding entry in the second plurality of details, flagging the entry as involving a first type of error. Additionally or alternatively, the validation processes can include determining a storage classification assigned by the first data provider to a physical object associated with the entry, determining whether the storage classification matches a target storage classification and, if the storage classification does not match the target storage classification, flagging the entry as involving a second type of error that is different from the first type of error. Additionally or alternatively, the validation processes can include determining whether a charge received from the first data provider in relation to the entry is within a predefined tolerance range of a target value and, if the charge is not within the predefined tolerance range of the target value, flagging the entry as involving a third type of error that is different from the first type of error and the second type of error. The data processing module can generate a processing result of the plurality of processing results that indicates whether the entry is flagged as having at least one of the first type of error, the second type of error, or the third type of error.

Another example of the present disclosure is a method comprising receiving a processing task involving identifying an error between a first dataset from a first data provider and a second dataset from a second data provider. The first dataset can include a first plurality of details relating to a plurality of physical objects stored or disposed of by the first data provider on behalf of the second data provider during a time period. The second dataset can include a second plurality of details relating to the plurality of physical objects stored or disposed of by the first data provider on behalf of the second data provider during the time period. The first plurality of details can be different from the second plurality of details. The method can also include generating a plurality of processing results based on the first plurality of details, for example by performing any one or more of the validation processes described above on each entry in the first plurality of details. The method can further include generating a graphical user interface based on the plurality of processing results. The graphical user interface can be configured to provide insights to the second data provider about one or more types of errors present in the first plurality of details received from the first data provider. Some or all of the method operations can be implemented by one or more processors of a distributed computing system.

Yet another example of the present disclosure can include a non-transitory computer-readable medium comprising program code that is executable by one or more processors for causing the one or more processors to perform the method described above.

BRIEF DESCRIPTION OF THE DRAWINGS

FIGS. 5-10 show descriptions of the example validation processes shown in the tree shown of FIG. 4 according to some aspects of the present disclosure.

DETAILED DESCRIPTION

Figure 1:
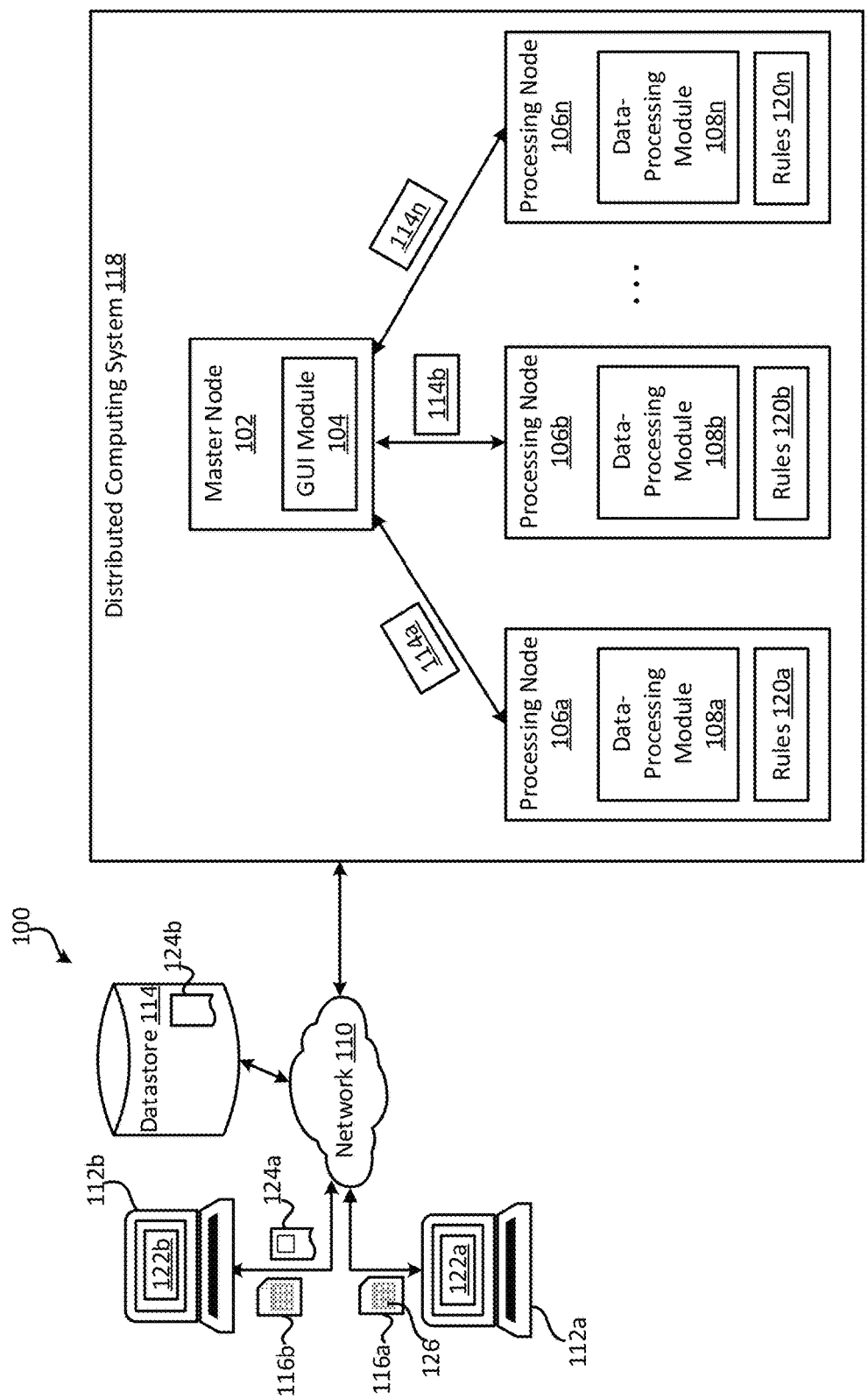
FIG. 1 is a block diagram of an example of a system according to some aspects of the present disclosure.

Big data is routinely used as inputs to various technical processes. In some cases, the big data may be generated and streamed in real time from sensors, for example from sensor packages of Internet of Things (JOT) devices. In other cases, the big data may be generated based on computer interactions, for example between a server and client devices as a result of web page interactions. Regardless of how the big data is generated, the big data is often assumed to be accurate upon receipt. For example, it is assumed that the sensors streaming the data are functioning properly or that the data was otherwise properly generated and recorded. As a result, conventional systems may only minimally preprocess (e.g., reformat) the big data before supplying the big data as input to a subsequent process. But in many cases, the big data actually includes errors that may diminish the accuracy of the subsequent process if they are not identified and corrected. Despite the need to identify and correct such errors in big data, conventional computer systems generally lack such capabilities. And performing such an analysis manually would be highly impractical given the significant volume of data involved.

Some examples of the present disclosure can overcome one or more of the abovementioned technical problems by providing a graphical user interface (GUI) and error detection system for automatically analyzing big data. The system can include a distributed computing system containing a cluster of processing nodes with executable software modules capable of processing the big data in parallel or in another coordinated manner based on a set of predefined rules for detecting errors in the big data. Performing the analysis using the predefined set of rules can yield more consistent and accurate results, at a faster speed, than may otherwise be possible using subjective manual analysis. The system can then output information about the errors in an interactive GUI, through which a user may gain a better understanding of the errors. For example, the GUI can indicate which types of errors are present in the big data, how prevalent they are, and the cumulative impact of each type of error. For instance, if a first type of error is present 10 times in the big data and a second type of error is present 1000 times in the big data, but the first type of error is more harmful than the second type of error, the GUI can indicate that the cumulative impact of the first type of error across the 10 instances is more problematic than the cumulative impact of the second type of error across the 1000 instances. This may allow the user to identify which errors are present in the big data and which types of errors are most concerning, so that such errors can be resolved. The errors can be resolved prior to the big data being transmitted as input to a subsequent process, which may improve the accuracy or outcome of the subsequent process.

In one specific example, the present system can be applied to detecting errors in one or more large bills (e.g., invoices), each of which may contain hundreds or thousands of rows of details relating to the storage or disposal of physical objects such as computers, robots, furniture, clothing, printers, appliances, etc. Given the magnitude of these bills, they may constitute big data that may be difficult or impossible to analyze manually. But in some examples, a system of the present disclosure can be used to automatically detect errors in the bills as part of a reconciliation process. In particular, the system can include a master node in a computing cluster that can receive the big data (e.g., the bills), generate one or more processing tasks based on the big data, and transmit the processing tasks to one or more processing nodes in the cluster. The one or more processing nodes can receive the processing tasks and responsively analyze their respective portion of the big data based on the predefined set of rules to identify various types of errors that may be present in the big data. Any identified errors can be output in an interactive GUI. For example, the GUI can indicate each type of error identified in the big data and the cumulative impact of each type of error over a period of time (e.g., over the course of multiple months associated with the multiple bills). The user can then select each type of error in the GUI to further explore the entries in the big data that contain the error. In this way, the GUI may allow the user to resolve the errors, for example before the bills are approved or another digital process is initiated with respect to the bills. In contrast, prior to the present system, the user may have simply approved the bills with little or no analysis thereof, given the infeasibility of analyzing the large number of data rows involved. As a result, users may be unaware of which types of errors are present in their big data and the cumulative impacts of those errors.

These illustrative examples are given to familiarize the reader with the general subject matter discussed herein and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 according to some aspects of the present disclosure. The system 100 can include one or more client devices 112a-b, such as laptop computers, desktop computers, or mobile phones. The system 100 can also include a distributed computing system 118. Examples of the distributed computing system 118 may include a cloud computing system or a data grid. The client devices 112a-b can communicate with the distributed computing system 118 via one or more networks 110, such as the Internet.

In some examples, the distributed computing system 118 can include a cluster of nodes. The cluster of nodes can include one or more master nodes 102 in communication with one or more processing nodes 106a-n. A master node can be any computing device (e.g., a server or desktop computer) configured to coordinate processing tasks among one or more processing nodes. A processing node can be any computing device configured to execute a processing task and return a processing result. In some examples, the master node 102 can split up a large data processing job into discrete processing tasks. The master node 102 can then assign the processing tasks to the processing nodes, which can execute the processing nodes in parallel or another organized fashion. This may dramatically increase the speed at which the data processing job can be completed. The processing nodes 106a-b can provide their processing results to the master node 102, at which point the master node 102 may further process the processing results and/or forward the processing results to one or more intended recipients, such as the client devices 112a-b.

In some examples, the distributed computing system 118 can provide a web portal or another online portal through which the client devices 112a-b can provide (e.g., upload) data for use by the distributed computing system 118. For example, users of the client devices 112a-b may be able to login to the portal by inputting authentication credentials such as a username and password. In response to the user logging in, the distributed computing system 118 can execute a graphical user interface (GUI) module 104 to present the users with interactive GUIs 122a-b, through which the users can provide big datasets 116a-b to the distributed computing system 118. The GUI module 104 can be any suitable software that is configured to generate GUIs 122a-b with which the users can interact to provide inputs and receive outputs. It will be appreciated that although the GUI module 104 is depicted as part of the master node 102 in FIG. 1, this is for illustrative purposes and not intended to be limiting. In other examples, the GUI module 104 may be located elsewhere in the distributed computing system 118 and executed by another component of the distributed computing system 118.

As mentioned above, the distributed computing system 118 can receive the big datasets 116a-b from the client devices 112a-b (e.g., via the GUI 122a). Each big dataset 116a-b may have 500 or more entries. The distributed computing system 118 can receive the big datasets 116a-b at the master node 102 or another node. In response to receiving the big datasets 116a-b, the distributed computing system 118 can generate one or more processing tasks 114a-n based on the big datasets 116a-b and transmit the one or more processing tasks 114a-n to one or more processing nodes 106a-n for execution. For example, the master node 102 can generate processing tasks 114a-n based on the big dataset 116a and transmit the processing tasks 114a-n to the processing nodes 106a-n for execution. In some examples, the distributed computing system 118 can determine how to coordinate and/or distribute the processing tasks 114a-n among the processing nodes 106a-n based on one or more factors. For example, the master node 102 can determine how to distributed the processing tasks 114a-n based on a load balancing scheme, which may be designed to distribute processing tasks among the processing nodes 106a-n. In some embodiments, the distribution of processing tasks among the processing nodes 106a-n may be even or relatively even such that each node completes and returns a result of the processing task in a similar length of time. Other factors that may be considered can include the available computing resources (e.g., CPU, RAM, storage, etc.) of the processing nodes 106a-n and/or the distributed computing system 118 as a whole.

Upon receiving the processing tasks 114a-n, the processing nodes 106a-n can execute respective data-processing modules 108a-n to perform their respective processing tasks 114a-n. For example, each of the processing nodes 106a-n may be assigned a respective portion of the big dataset 116a to handle. The processing nodes 106a-n can each receive their respective portion of the big dataset 116a (e.g., from the master node 102) and execute their respective data-processing module 108a-n to analyze that portion of the big dataset 116a. Analyzing a portion of a big dataset 116a may involving applying a respective set of rules 120a-n to that portion of the big dataset 116a. The rules 120a-n can be configured for detecting errors in the big dataset 116a. The processing nodes 106a-c may have the same rules or different rules from one another. For example, rules 120a may be the same as or different from rules 120b. By applying the rules 120a-n to the big dataset 116a, one or more types of errors therein may be identified in the big dataset 116a. The identified errors may be flagged and returned (e.g., to the master node 102) by the processing nodes 106a-n as processing results.

Based on the processing results, the distributed computing system 118 (e.g., the master node 102) can update the interactive GUIs 122a-b to indicate the identified types of errors in the big dataset 116a. For example, the GUIs 122a-b can indicate each type of error identified in the big dataset 116a, how many times that type of error occurred in the big dataset 116a, and the cumulative impact of that type of error. The GUIs 122a-b can indicate each type of error using any suitable type of graphical approach. For instance, each type of error can be represented in a separate tab or frame than the other types of errors for easy navigation. Users of the client devices 112a-b can view the GUIs 122a-b to learn which types of errors and are most problematic. Based on these insights, the users can initiate one or more operations to resolve some or all of the identified types of errors.

As one specific example, the client device 112a may correspond to a first entity that provides a system (e.g., a website and storage facility) through which various physical objects may be obtained via the Internet. The client device 112b may correspond to a second entity that may provide physical objects to the first entity in a consignment arrangement, whereby the first entity may store and dispose of the physical objects on behalf of the second entity. On a regular basis, the first entity may provide a bill to the second entity that may have hundreds or thousands of entries related to this arrangement between the parties. For example, the first entity may assign charges for receiving the physical objects, unpacking them, storing them, fulfilling orders, and handling returns and other issues. The first entity may also offset some of these charges based on various factors, for example based on damages to physical objects and other problems. The bill can include rows with transactional details relating to hundreds or thousands of physical objects, resulting in a massive dataset that may be confusing, complex, and generally difficult to manage using conventional techniques. But in some examples, the bill can serve as a big dataset 116a capable of being analyzed by the distributed computing system 118.

Continuing with the above example, the first entity can generate and provide a bill each month. For instance, the first entity may generate and transmit the bills to the second entity by e-mail or via another communications medium. Upon receiving the bills, the second entity can provide the bills to the distributed computing system 118 for analysis. Alternatively, the first entity may transmit the bills more directly to the distributed computing system 118, for example via the GUI 122a. Either way, the distributed computing system 118 can receive, directly or indirectly, the bills from the first entity. Thus, the first entity can serve as a first data provider in this scenario.

The distributed computing system 118 may also receive one or more reference datasets 124a-b for use in performing the analysis. The reference datasets 124a-b may be received from the second entity, from one or more datastores 114, or both. For example, the second entity may upload a reference dataset 124a via the GUI 122b to the distributed computing system 118. The reference dataset 124a may also be a big dataset. In this scenario, the second entity or the datastore 114 can be considered a second data provider.

In some examples, the reference datasets 124a-b may indicate the physical characteristics of the physical objects provided to the first entity by the second entity. For example, the reference datasets 124a-b may indicate physical characteristics such as the dimensions, weight, color, and type of each physical object provided by the second entity to the first entity. The second entity may maintain such a list of the physical characteristics and periodically update the list as needed. Additionally or alternatively, the reference datasets 124a-b can include disposal data indicating which physical objects were sold by the first entity and when (e.g., as timestamps). Such disposal data may be provided by the first entity separately from the bill and may be provided on a more frequent basis, such as on a daily basis. In some examples, the first entity may provide the disposal data to the second entity, which in turn can provide (e.g., via GUI 122b) the disposal data to the distributed computing system 118. Alternatively, the first entity may provide (e.g., via GUI 122a) the disposal data more directly to the distributed computing system 118.

Having received the bills and the one or more reference datasets 124a-b, the distributed computing system 118 can then perform the analysis using the processing nodes 116a-n. The analysis process can involve performing one or more validation processes on each entry in the bills to determine whether the entry (e.g., data row) satisfies the one or more rules 120a-n, where each rule may be configured for identifying a particular type of error in an entry. Examples of four validation processes that can be performed, for example on each entry, will now be described.

A first validation process can involve the processing node 106a determining whether an entry 126 in the bill has a corresponding entry in a first reference dataset 124a. If the first reference dataset 124a includes disposal data, then the first validation process may involve determining whether there is a corresponding entry in the disposal data. Two entries may "correspond" to one another if they relate to the same transactional event. If there is not a corresponding entry in the first reference dataset 124a, it may mean that the entry 126 in the bill may be invalid, since there is no proof that the physical object was actually disposed of So, the processing node 106a may flag the entry 126 has having a first type of error (e.g., an "unverified disposal" error).

A second validation process can involve the processing node 106a determining the whether a physical object associated with the entry 126 in the bill is also described in a second reference dataset 124b. The second reference dataset 124 may be an object database stored in the datastore 114. The second reference dataset 124b may describe the objects provided by the second entity to the first entity. If the second reference dataset 124b does not list the physical object associated with the entry 126 in the bill, it may mean that the physical object actually belongs to a third party (an entity other than the first entity and the second entity) and that the entry 126 was erroneously added to the bill for the second entity. So, the processing node 106a can flag the entry 126 has having a second type of error (e.g., an "object not found" error).

A third validation process can involve the processing node 106a determining a target storage classification for the physical object that is associated with the entry 126 in the bill. The target storage classification can be determined based on one or more physical characteristics of the physical object. For example, the storage classification can be determined based on the dimensions (e.g., length, width, and height) of the physical object. Larger items like furniture may need to be stored in larger bins or otherwise in different locations than smaller items like clothing, so the larger items may be assigned a different storage classification than the smaller items due to their respective sizes. The processing node 106a can then compare the target storage classification for the physical object to the actual storage classification, which is the storage classification actually assigned to the physical object by the first entity. The actual storage classification may be included in the entry 126 of the bill. If the target storage classification is different from the actual storage classification, it may result in improper charges. So, the processing node 106a can flag the entry 126 has having a third type of error (e.g., an "incorrect storage classification" error).

A fourth validation process can involve the processing node 106a determining if a charge (e.g., the total charge) associated with the entry 126 in the bill is within a predefined tolerance range of a target value. The processing node 106a can determine the target value based on one or more factors. Examples of these factors can include negotiated or standardized values for receiving the physical objects, unpacking them, storing them, etc.; the target or actual storage location for the physical object; the physical characteristics of the physical object; or any combination of these. Some or all of this information may be extracted from the reference datasets 124a-b. The processing node 106a can determine the target value by applying one or more algorithms based on these factors. If the charge is not within the predefined tolerance range of the target value, it may indicate an improper charge. So, the processing node 106a may flag the entry 126 has having a fourth type of error (e.g., an "improper charge" error).

The distributed computing system 118 can perform any number and combination of the above validation processes on the entries in the bill to determine if any errors are present therein and which types of errors are present. The above validation processes are examples and are not intended to be limiting. Other types of validation processes are also capable of being implemented in addition to, or as alternatives to, those described above.

After identifying one or more types of errors in the big dataset 116a (e.g., bills), the distributed computing system 118 can operate the GUI module 104 to configure the GUIs 122a-b to indicate the identified types of errors. Since the big dataset 116a can may include entries spanning a timeframe (e.g., it may include multiple bills spanning multiple months), the distributed computing system 118 can also identify patterns with respect to each type of error over that timeframe. For example, the distributed computing system 118 can determine whether each type of error is occurring with increasing or decreasing frequency over that timeframe and output such insights in the GUIs 122a-b. For instance, the GUIs 122a-b can include plots (e.g., graph) showing the number of occurrences of each type of error over time. This can help the users of the GUIs 122a-b learn which types of errors are present in their big datasets and whether the impacts of those errors are increasing or decreasing over time.

Upon viewing the GUIs 122a-b, in some examples the users GUIs 122a-b can perform one or more operations to resolve the errors. For example, the second entity can select a button in the GUI 122b to notify the first entity of one or more types of errors in the big dataset 116a. The distributed computing system 118 can detect the selection and responsively notify (e.g., via an e-mail or other electronic communication) the first entity of a type of error in the big dataset 116a. This may allow the first entity can correct the error in the big dataset 116a. In this way, the big dataset 116a can be automatically analyzed for errors and those errors can be resolved prior to the big dataset 116a being used in subsequent processes.

In some examples, a GUIs 122a-b may include an option for allowing a user to select a time window of interest. The distributed computing system 118 can then to automatically analyze entries in the big datasets 116a-b that are associated with the selected time window and output the corresponding results in the GUIs 122a-b. This may allow the user to focus the analysis on certain time window of interest, while simultaneously reducing the workload on the distributed computing system 118.

It will be appreciated that although FIG. 1 depicts a certain number and arrangement of components, this is intended to be illustrative and non-limiting. Other examples may involve more components, fewer components, different components, or a different arrangement of the components shown in FIG. 1. For instance, the datastore 114 may be internal to the distributed computing system 118 in another example.

Figure 2:
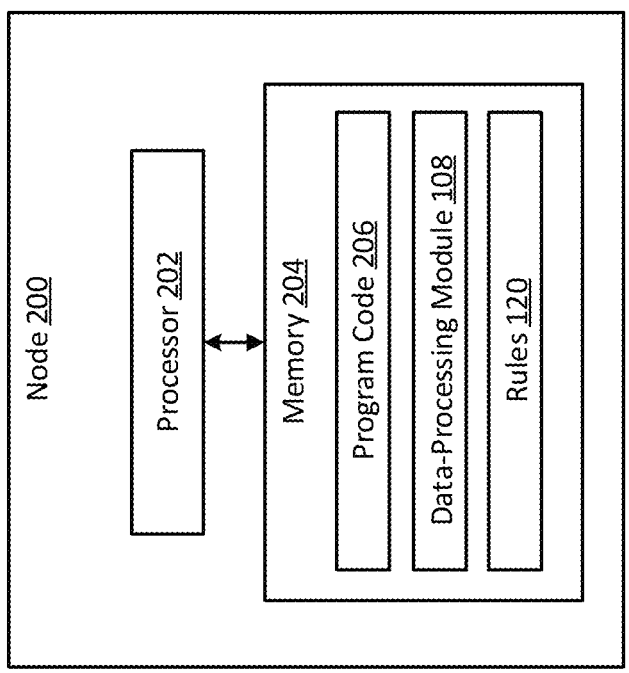
FIG. 2 is a block diagram of an example of a node according to some aspects of the present disclosure.

FIG. 2 is a block diagram of an example of a node 200 according to some aspects of the present disclosure. The node 200 can correspond to, for example, any of the processing nodes 106a-n of FIG. 1. The node 200 includes a processor 202 communicatively coupled with a memory 204. The processor 202 can include one processing device or multiple processing devices. Non-limiting examples of the processor 202 include a Field-Programmable Gate Array (FPGA), an application-specific integrated circuit (ASIC), and a microprocessor. The processor 202 can execute program code 206 stored in the memory 204 to perform operations, such as any of the operations described herein. In some examples, the program code 206 can include processor-specific instructions generated by a compiler or an interpreter from code written in any suitable computer-programming language, such as Java, Python, Perl, PHP, C, C++, or C#.

The memory 204 can include one memory device or multiple memory devices. The memory 204 can be non-volatile and may include any type of memory device that maintains stored data when powered off. Examples of the memory 204 include electrically erasable and programmable read-only memory (EEPROM), flash memory, or any other type of non-volatile memory. At least some of the memory can include a non-transitory computer-readable medium from which the processor 202 can read program code 206. A computer-readable medium can include electronic, optical, magnetic, or other storage devices capable of providing the processor 202 with computer-readable instructions or other program code. Examples of such computer-readable mediums include magnetic disks, memory chips, ROM, random-access memory (RAM), an ASIC, a configured processor, optical storage, or any other device from which a computer processor can read the program code 206.

In some examples, the memory 204 can include the data-processing module 108 and the rules 120. The data-processing module 108 can be any suitable software for analyzing a dataset based on the rules 120. The rules 120 may be predefined, in that they are configured prior to the initiation of a processing task that uses the rules 120. In some examples, the rules 120 may be user customizable and adjustable over time (e.g., dynamically changeable).

The node 200 may also include other components, such as input/output interfaces, network interfaces, display units, busses, microphones, speakers, and so on, which have been excluded from FIG. 2 for simplicity.

Figure 3:
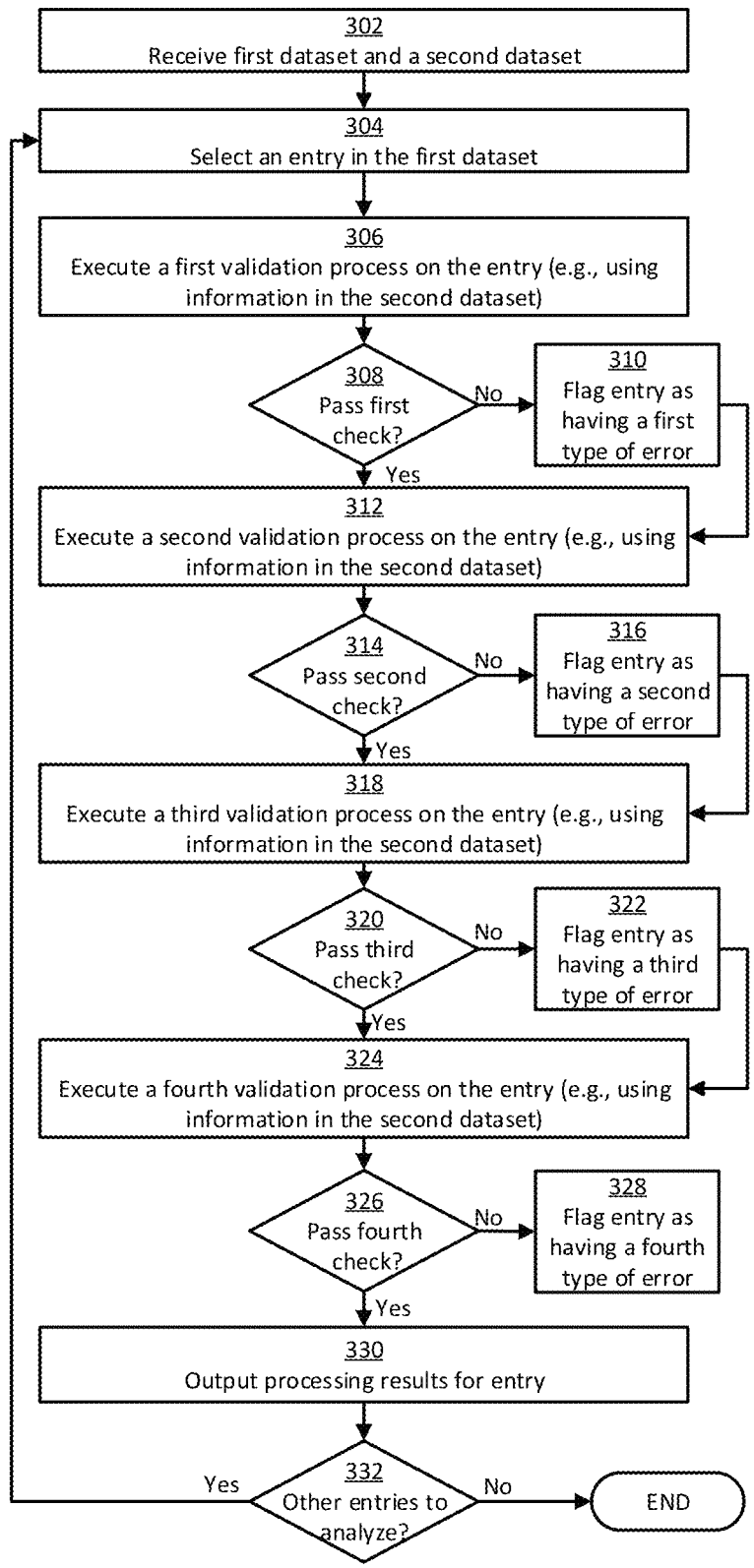
FIG. 3 is a flow chart of an example of a process for implementing some aspects of the present disclosure.

FIG. 3 is a flow chart of an example of a process for implementing some aspects of the present disclosure. Other examples may include more operations, fewer operations, different operations, or a different order of the operations than is shown in FIG. 3. The operations of FIG. 3 are described below with reference to the components of FIG. 1 described above.

In block 302, the distributed computing system 118 (e.g., a processing node 106a) can receive a first dataset and a second dataset. An example of the first dataset can include the big dataset 116a. Examples of the second dataset can include the big dataset 116b, the first reference dataset 124a, or the second reference dataset 124b. The first dataset may be generated by (e.g., originate from) a first data provider and the second dataset may be generated by a second data provider. An example of the first data provider can be the first entity associated with the client device 112a, and an example of the second data provider can be the second entity associated with the client device 112b.

In some examples, the first dataset can include a first plurality of details relating to a plurality of physical objects stored or disposed of by the first data provider on behalf of the second data provider during a time period. The second dataset can include a second plurality of details relating to the plurality of physical objects. The first plurality of details can be different from the second plurality of details.

In block 304, the distributed computing system 118 can select an entry in the first dataset. For example, the distributed computing system 118 can randomly select the entry or select the entry according to a predefined order (e.g., numerical order).

In block 306, the distributed computing system 118 executes a first validation process on the entry. The first validation process can include any one of the four validation processes described above or any of the other validation processes described elsewhere herein (e.g., the validation processes depicted in FIG. 4). For example, the first validation process may correspond to the first validation process described above for detecting the "unverified disposal error".

In block 308, the distributed computing system 118 determines whether the entry passed the first validation process. If not, the process can proceed to block 310 where the distributed computing system 118 can flag the entry as having a first type of error. If so, the distributed computing system 118 can proceed to block 312 without flagging the entry as having the first type of error.

In block 312, the distributed computing system 118 executes a second validation process on the entry. The second validation process can include any one of the four validation processes described above, or any of the other validation processes described elsewhere herein, so long as the second validation process is different from the first validation process. For example, the second validation process may correspond to the second validation process described above for detecting the "object not found" error.

In block 314, the distributed computing system 118 determines whether the entry passed the second validation process. If not, the process can proceed to block 316 where the distributed computing system 118 can flag the entry as having a second type of error. If so, the distributed computing system 118 can proceed to block 318 without flagging the entry as having the second type of error.

In block 318, the distributed computing system 118 executes a third validation process on the entry. The third validation process can include any one of the four validation processes described above, or any of the other validation processes described elsewhere herein, so long as the third validation process is different from the first validation process and the second validation process. For example, the third validation process may correspond to the third validation process described above for detecting the "incorrect storage location" error.

In block 320, the distributed computing system 118 determines whether the entry passed the third validation process. If not, the process can proceed to block 322 where the distributed computing system 118 can flag the entry as having a third type of error. If so, the distributed computing system 118 can proceed to block 324 without flagging the entry as having the third type of error.

In block 324, the distributed computing system 118 executes a fourth validation process on the entry. The fourth validation process can include any one of the four validation processes described above, or any of the other validation processes described elsewhere herein, so long as the fourth validation process is different from the first, second, and third validation processes. For example, the fourth validation process may correspond to the fourth validation process described above for detecting the "improper charge" error.

In block 326, the distributed computing system 118 determines whether the entry passed the fourth validation process. If not, the process can proceed to block 328 where the distributed computing system 118 can flag the entry as having a fourth type of error. If so, the distributed computing system 118 can proceed to block 330 without flagging the entry as having the fourth type of error.

In block 330, the distributed computing system 118 outputs the processing results for the entry. For example, the distributed computing system 118 can update a GUI 122 to indicate whether the entry contains any errors and which types of errors are contained in the entry.

In block 332, the distributed computing system 118 determines if there are other entries that need to be analyzed. If so, the process can return to block 304 where a new entry can be selected and the process can iterate for the new entry. Otherwise, the process can end.

It will be appreciated that although FIG. 3 shows four validation processes, this is for illustrative purposes and not intended to be limiting. Other examples may involve more or fewer validation processes. For instance, another example may involve a dozen or more validation processes that may or may not be executed in a particular order.

Figure 4:
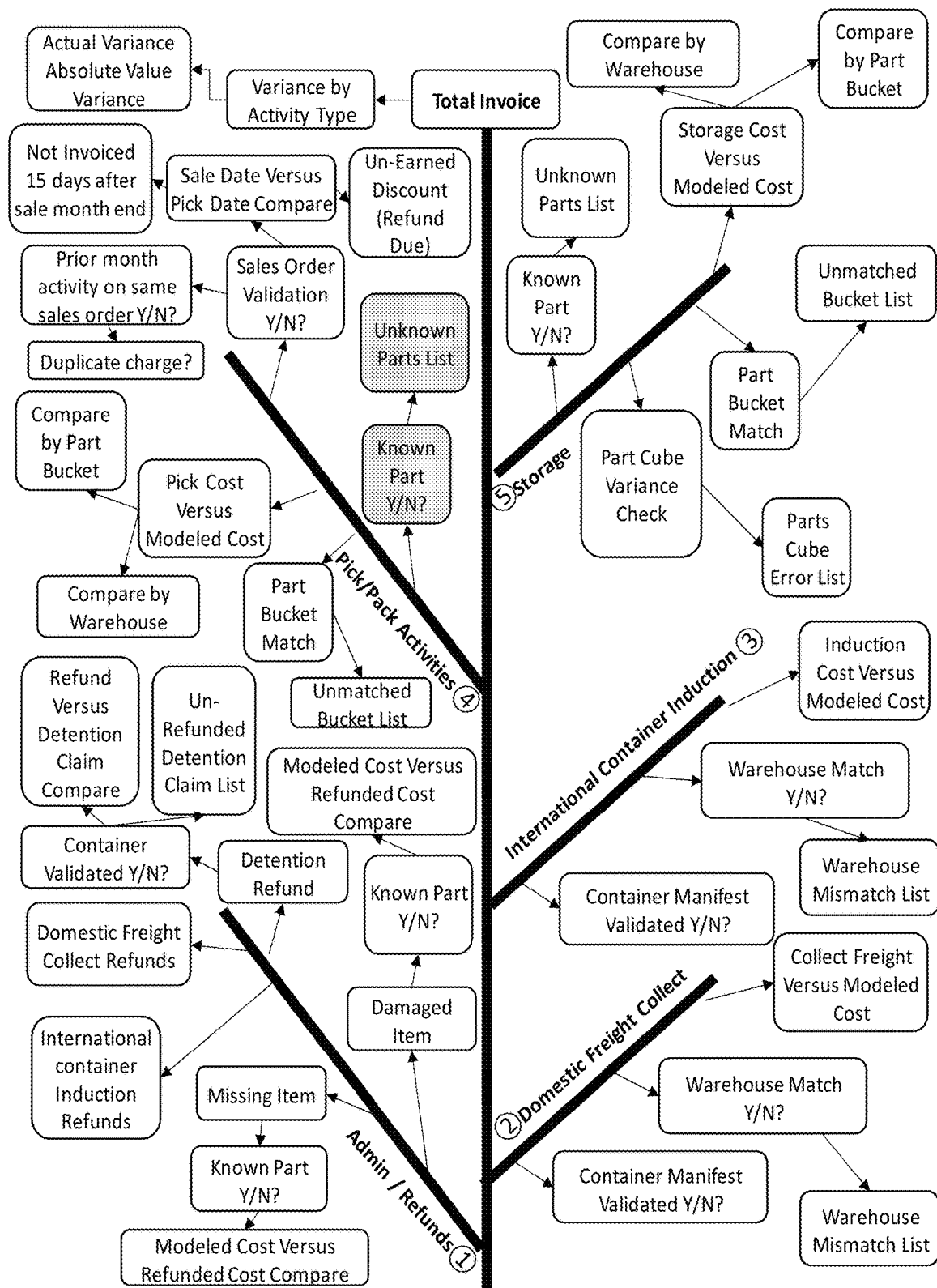
FIG. 4 depicts a tree including various examples of validation processes that can be performed to implement some aspects of the present disclosure.
Figure 5:
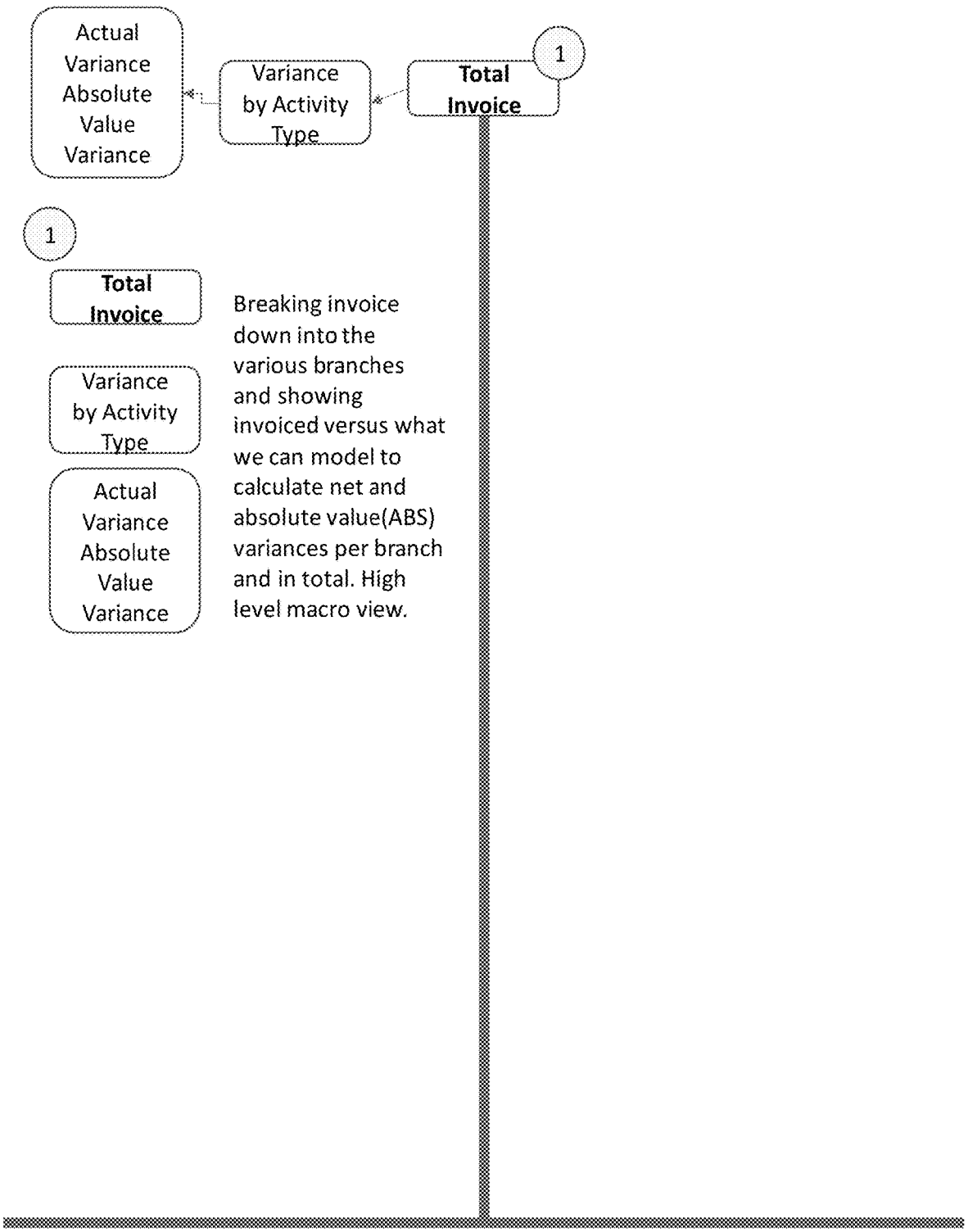
Figure 6:
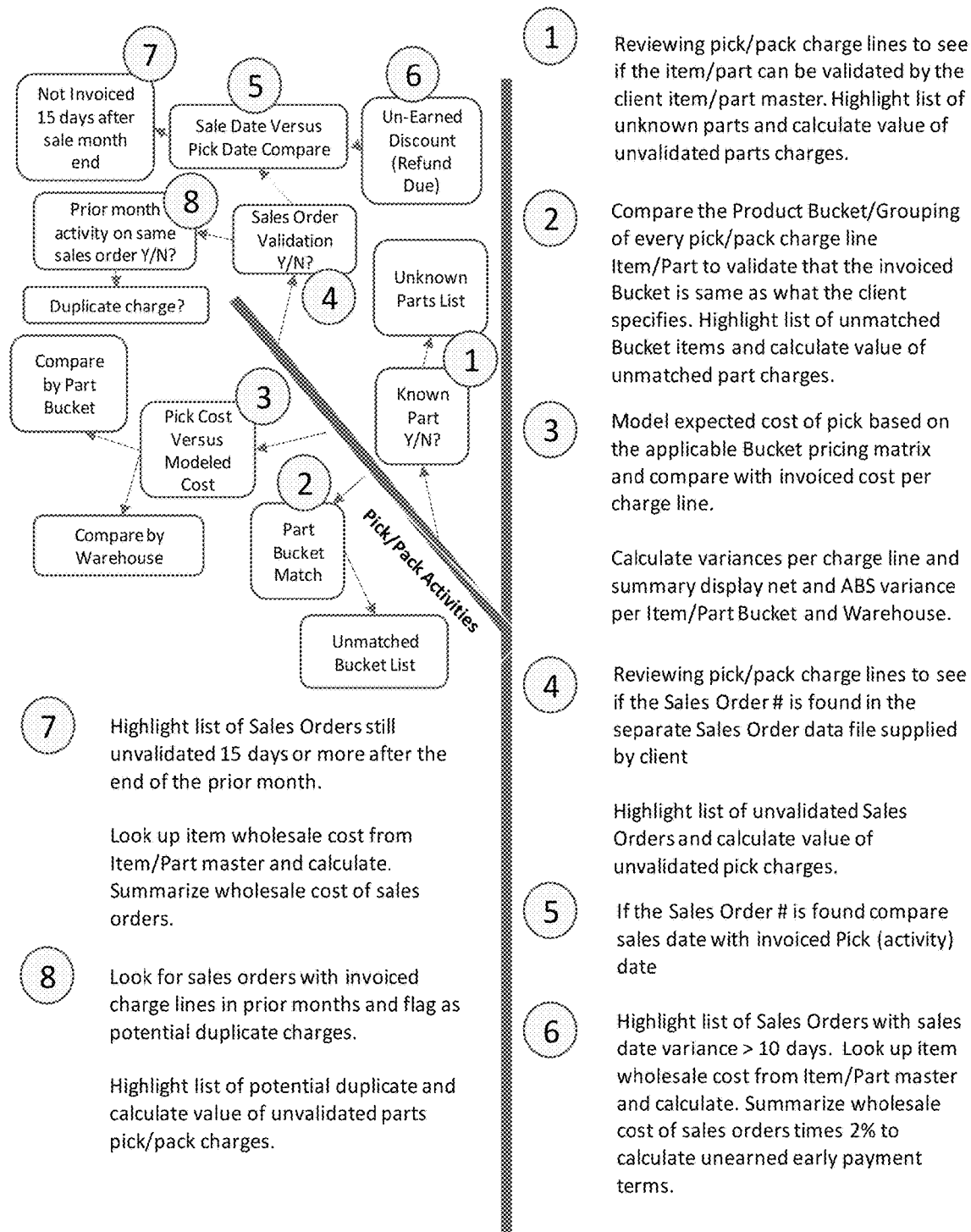
Figure 10:
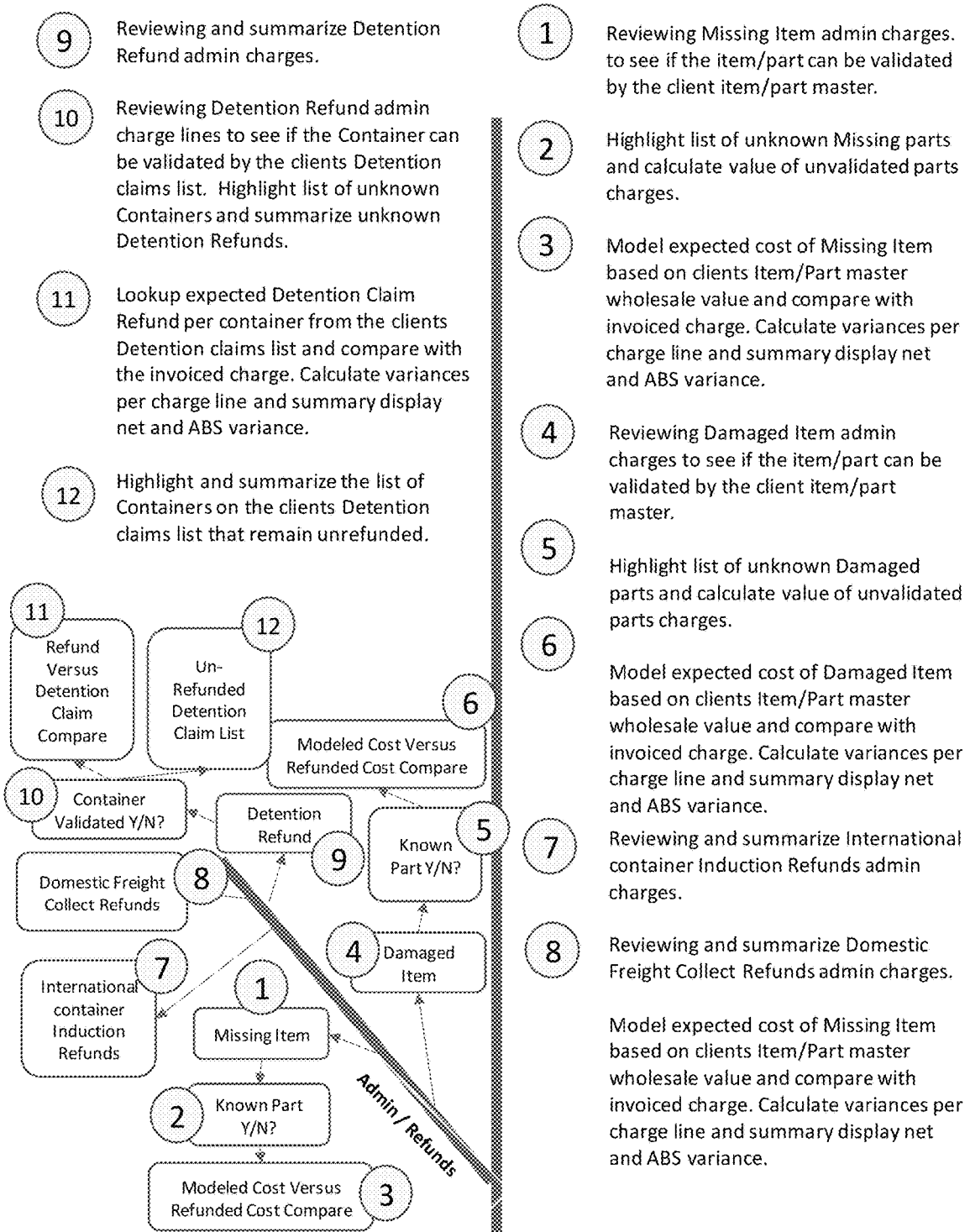

Referring now to FIG. 4, shown is a tree of example validation processes (e.g., tests) that are divided into multiple branches (designated with numerals 1-5), where each branch involves a different validation process category than the other branches. Nodes are connected to each branch. Some of the nodes can represent validation processes (e.g., "yes/no" decisions), which the results of which can lead to subsequent nodes. The subsequent nodes may include additional validation processes or resulting operations. For example, branch 4 includes a node corresponding to a validation process for whether a physical object is a known part. This node is highlighted in gray for illustrative purposes. If the physical object is not a known part, then the object can be added to an "unknown parts list," as depicted in another gray leaf node. In some examples, the system can automatically perform the validation processes in the order that they are shown in the tree. Alternatively, the system can automatically perform any number and combination of the validation processes shown in FIG. 4 in any suitable order.

FIGS. 5-10 describe the validation processes shown in each branch of the tree, where each encircled number in these figures corresponds to an individual validation process and has a corresponding encircled number that provides a description of the validation process. These descriptions are intended to be illustrative and non-limiting. In other examples, the validation processes may involve different operations than those described in the descriptions. Additionally, the specific numbers of days, tolerance values, and other parameters included in the descriptions are also intended to be illustrative and non-limiting. In other examples, these parameters may be different.

Figure 11:
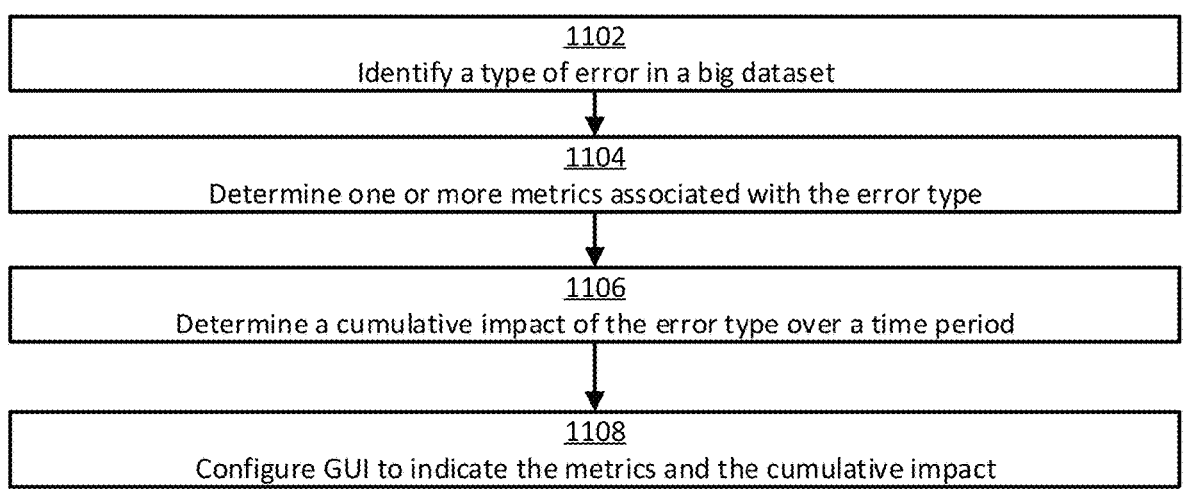
FIG. 11 is a flow chart of an example of a process for determining insights associated with error types according to some aspects of the present disclosure.

FIG. 11 is a flow chart of an example of a process for determining insights associated with error types according to some aspects of the present disclosure. Other examples may include more operations, fewer operations, different operations, or a different order of operations than is shown in FIG. 11.

In block 1102, a distributed computing system identifies a type of error in a big dataset. This may be achieved by performing the process shown in FIG. 3.

In block 1104, a distributed computing system determines one or more metrics associated with the error type. The metrics can include statistical metrics or other types of metrics. Examples of the metrics can include a total number of instances of the error type over a time period, a variance in the number of instances of the error type over a time period, a frequency of the error type over a time period, a deviation of the number of instances of the error type over a time period from an expected number of instances of the error type over the time period, or any combination of these. For example, the big dataset may include entries spanning a six-month time period. The distributed computing system can count the total number of times the error type occurred during the six-month time period. As another example, the distributed computing system can determine an average number of times that the error type occurred per day or per week over the six-month time period. As still another example, the distributed computing system can compare the average number of times that the error type occurred (e.g., per day) during the six-month period against a predetermined baseline value, to determine whether the average number of times deviated from the predetermined baseline value by more than a threshold amount. If the deviation exceeds the threshold amount, the distributed computing system can flag the deviation.

In block 1106, the distributed computing system determines a cumulative impact of the error type over a time period. For example, each entry in the big dataset that corresponds to the error type may include a score (e.g., a charge). The distributed computing system can aggregate all of the scores for all those entries over the time period, to determine a cumulative impact of the error type over the time period. For instance, the distributed computing system can add together all of the scores to determine a cumulative score that represents the cumulative impact of the error type over the time period.

In block 1108, the distributed computing system configures a GUI (e.g., GUIs 122*a-b* of FIG. 1) to indicate the one or more metrics and/or the cumulative impact. For example, the GUI can include a graph showing the number of times the error type occurred on a daily basis over a six-month time period. This graph can indicate a trend associated with the error type (e.g., whether it is increasing or decreasing in frequency) for a viewer. In some examples, the GUI can be interactive. For example, a user can select the error type and the GUI can responsively output a list of some or all of the entries over the time period in which the error type occurred. This may help the user drill down into the details to learn more about the error type.

The above process can be repeated for multiple times, for example to identify multiple error types in a single big dataset or across multiple big datasets. From this information, a GUI can be generated that includes a dashboard showing some or all of the identified types of errors and other relevant information (e.g., their metrics and/or the cumulative impacts). A user can view the GUI to learn the root cause of inaccuracies in the big dataset(s).

Figure 12:
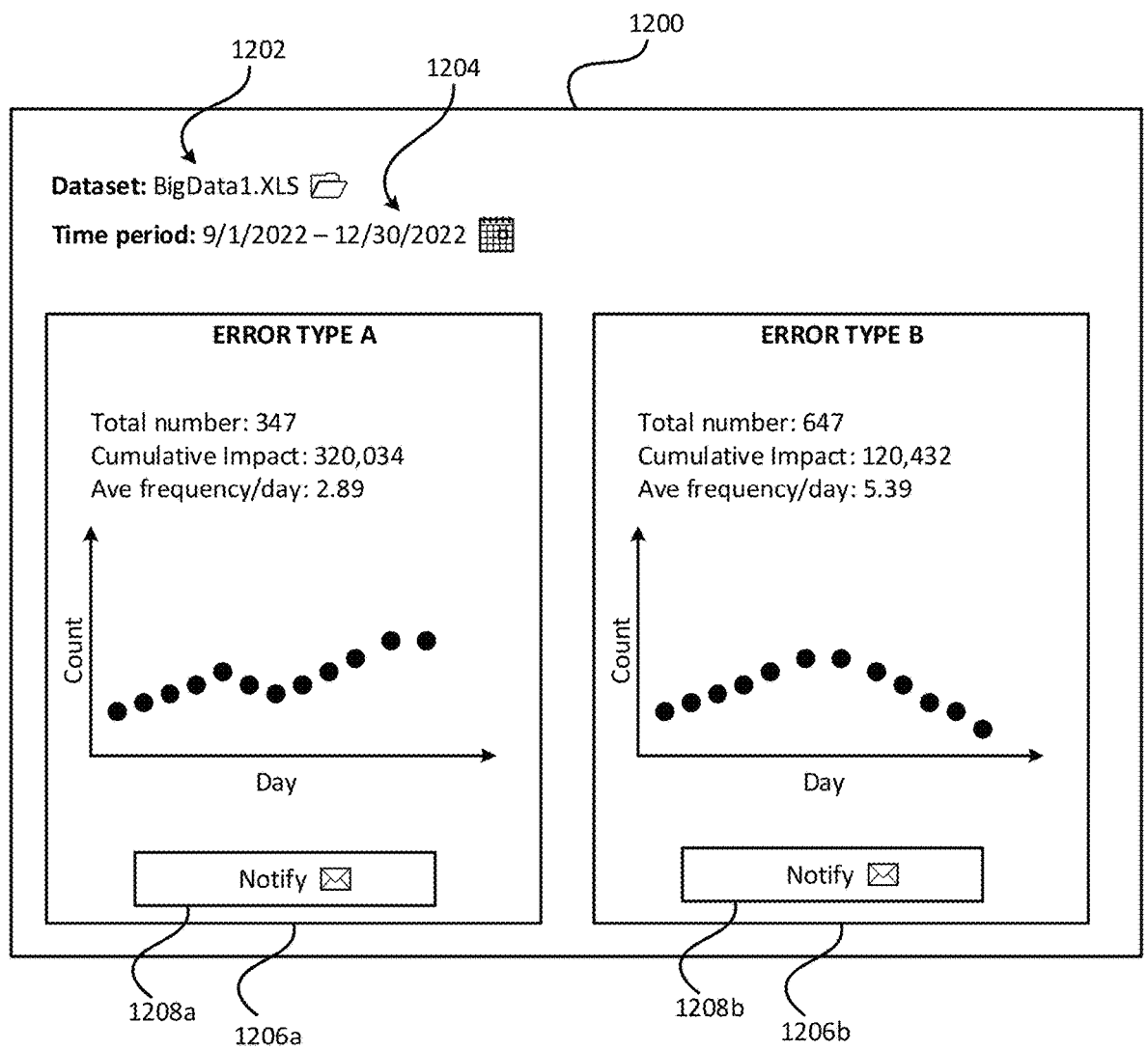
FIG. 12 shows an example of a graphical user interface according to some aspects of the present disclosure.

One example of the GUI is shown in FIG. 12. As shown, the GUI 1200 can include a graphical option 1202 through which a user can select a big dataset for analysis. The GUI 1200 can also include a graphical option 1204 through which the user can select a time period for analysis. The distributed computing system can then analyze entries associated with the selected time period in the big dataset to identify one or more error types in those entries. The GUI 1200 can also include graphical frames 1206*a-b* indicating the identified error types, which in this example is Error Type A and Error Type B, though any number of error types may be identified by the analysis.

In some examples, the graphical frames 1206*a-b* can also include metrics related to each of the identified error types. For example, the graphical frame 1206*a* can indicate the total number of occurrences of Error Type A during the selected time period, a cumulative impact of those occurrences during the selected time period, and an average frequency-per-time unit (e.g., per day or per week) in which Error Type A occurred. Graphical frame 1206*a* can also include a graph showing the occurrences of Error Type A over the selected time period. From the graph, an overall trend in the number of occurrences of Error Type A can be determined. Other types of graphs and metrics may additionally or alternatively be incorporated into the graphical frame 1206*a* to provide other insights. Graphical frame 1206*b* can include similar content for Error Type B.

In some examples, a user can view the GUI 1200 to glean important information about the types of errors in the big dataset and their impact. For example, the user may learn that, although Error Type A occurs with less frequency in the big dataset, it has a larger cumulative impact than Error Type B. The user may also learn that occurrences of Error Type A are trending upwards, whereas occurrences of Error Type B are trending downwards. So the user may focus on resolving Error Type A rather than, or prior to, resolving Error Type B.

In some examples, the GUI 1200 can include features configured to help facilitate resolution of one or more of the error types. For example, the user can select a notify button 1208*a* associated with Error Type A to facilitate resolution of this error type. In response to the user selection of the notify button 1208*a*, the distributed computing system may transmit an electronic notification to a recipient. The electronic notification may include some or all of the information in the graphical frame 1206*a*. The recipient can may be, for example, the entity that generated the big dataset. In response to receiving the notification, the recipient may take steps to mitigate this error type in the future. Alternatively, the recipient may modify the big dataset to resolve the errors therein, and then resubmit the big dataset for analysis by the distributed computing system.

The above description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A distributed computing system, comprising:
a master node configured to transmit processing tasks to one or more processing nodes;
the one or more processing nodes, wherein the one or more processing nodes include one or more processors and one or more non-transitory computer-readable mediums comprising program code that is executable by the one or more processors for causing the one or more processing nodes to:
receive a processing task from the master node, the processing task involving identifying an error between a first dataset from a first data provider and a second dataset from a second data provider, the first dataset including a first plurality of details relating to a plurality of physical objects stored or disposed of by the first data provider on behalf of the second data provider during a time period, and the second dataset including a second plurality of details relating to the plurality of physical objects stored or disposed of by the first data provider on behalf of the second data provider during the time period, the first plurality of details being different from the second plurality of details; and
execute a data processing module in response to receiving the processing task, the data processing module being configured to generate a plurality of processing results based on the first plurality of details by, for each entry in the first plurality of details:
determining whether the entry also has a corresponding entry in the second plurality of details;
if the entry does not have the corresponding entry in the second plurality of details, flagging the entry as involving a first type of error;
determining a storage classification assigned by the first data provider to a physical object associated with the entry;
determining whether the storage classification matches a target storage classification;
if the storage classification does not match the target storage classification, flagging the entry as involving a second type of error that is different from the first type of error;
determining whether a charge received from the first data provider in relation to the entry is within a predefined tolerance range of a target value;
if the charge is not within the predefined tolerance range of the target value, flagging the entry as involving a third type of error that is different from the first type of error and the second type of error; and generating a processing result of the plurality of processing results, the processing result indicating whether the entry is flagged as having at least one of the first type of error, the second type of error, or the third type of error; and a graphical user interface module that is executable to generate a graphical user interface based on the plurality of processing results, the graphical user interface being configured to provide insights to the second data provider about one or more types of errors present in the first plurality of details received from the first data provider.

2. The distributed computing system of claim 1, wherein the first dataset is a bill provided by the first data provider to the second data provider for storing or disposing of the plurality of physical objects during the time period.

3. The distributed computing system of claim 1, wherein the first plurality of details comprises a table including at least 1000 rows.

4. The distributed computing system of claim 1, wherein the program code is further executable by the one or more processors for causing the one or more processing nodes to:
  determine whether the physical object is described in an object database; and
  in response to determining that the physical object is not described in the object database, flag the entry as involving a fourth type of error that is different from the first, second, and third types of errors.

5. The distributed computing system of claim 1, wherein the graphical user interface is interactive, and wherein the graphical user interface module is further executable to:
  receive a selected time period from a user; and
  in response to receiving the selected time period, update the graphical user interface to indicate which types of errors are present in a plurality of datasets from the first data provider over the selected time period.

6. The distributed computing system of claim 1, wherein the program code is further executable by the one or more processors for causing the one or more processing nodes to determine the target storage classification based on one or more physical dimensions of the physical object.

7. A method comprising:
  receiving, by a distributed computing system, a processing task involving identifying an error between a first dataset from a first data provider and a second dataset from a second data provider, the first dataset including a first plurality of details relating to a plurality of physical objects stored or disposed of by the first data provider on behalf of the second data provider during a time period, and the second dataset including a second plurality of details relating to the plurality of physical objects stored or disposed of by the first data provider on behalf of the second data provider during the time period, the first plurality of details being different from the second plurality of details; and
  generating, by the distributed computing system, a plurality of processing results based on the first plurality of details by, for each entry in the first plurality of details:
    determining whether the entry also has a corresponding entry in the second plurality of details;
    if the entry does not have the corresponding entry in the second plurality of details, flagging the entry as involving a first type of error;
    determining a storage classification assigned by the first data provider to a physical object associated with the entry during the time period;
    determining whether the storage classification matches a target storage classification;
    if the storage classification does not match the target storage classification, flagging the entry as involving a second type of error that is different from the first type of error;
    determining whether a charge received from the first data provider in relation to the entry is within a predefined tolerance range of a target value;
    if the charge is not within the predefined tolerance range of the target value, flagging the entry as involving a third type of error that is different from the first type of error and the second type of error; and
    generating a processing result of the plurality of processing results, the processing result indicating whether the entry is flagged as having at least one of the first type of error, the second type of error, or the third type of error; and
  generating, by the distributed computing system, a graphical user interface based on the plurality of processing results, the graphical user interface being configured to provide insights to the second data provider about one or more types of errors present in the first plurality of details.

8. The method of claim 7, wherein the first dataset is a bill provided by the first data provider to the second data provider for storing or disposing of the plurality of physical objects during the time period.

9. The method of claim 7, wherein the first plurality of details comprises a table including at least 500 rows.

10. The method of claim 7, further comprising:
  determining whether the physical object is described in an object database; and
  in response to determining that the physical object is not described in the object database, flagging the entry as involving a fourth type of error that is different from the first, second, and third types of errors.

11. The method of claim 7, wherein the graphical user interface is interactive and capable of receiving a selected time period from a user and reacting by indicating which types of errors are present in a plurality of datasets from the first data provider over the selected time period.

12. The method of claim 7, further comprising determining the target storage classification based on one or more physical characteristics of the physical object.

13. The method of claim 7, further comprising:
  transmitting an electronic communication to the first data provider, the electronic communication being configured to notify the first data provider of the one or more types of errors.

14. A non-transitory computer-readable medium comprising program code that is executable by one or more processors for causing the one or more processors to:
  receive a processing task involving identifying an error between a first dataset from a first data provider and a second dataset from a second data provider, the first dataset including a first plurality of details relating to a plurality of physical objects stored or disposed of by the first data provider on behalf of the second data provider during a time period, and the second dataset including a second plurality of details relating to the plurality of physical objects stored or disposed of by the first data provider on behalf of the second data provider during the time period, the first plurality of details being different from the second plurality of details; and generate a plurality of processing results based on the first plurality of details by, for each entry in the first plurality of details:
  determining whether the entry also has a corresponding entry in the second plurality of details;
  if the entry does not have the corresponding entry in the second plurality of details, flagging the entry as involving a first type of error;
  determining a storage classification assigned by the first data provider to a physical object associated with the entry during the time period;
  determining whether the storage classification matches a target storage classification;
  if the storage classification does not match the target storage classification, flagging the entry as involving a second type of error that is different from the first type of error;
  determining whether a charge received from the first data provider in relation to the entry is within a predefined tolerance range of a target value;
  if the charge is not within the predefined tolerance range of the target value, flagging the entry as involving a third type of error that is different from the first type of error and the second type of error; and
  generating a processing result of the plurality of processing results, the processing result indicating whether the entry is flagged as having at least one of the first type of error, the second type of error, or the third type of error; and
generate a graphical user interface based on the plurality of processing results, the graphical user interface being configured to provide insights to the second data provider about one or more types of errors present in the first plurality of details.

15. The non-transitory computer-readable medium of claim 14, wherein the first dataset is a bill provided by the first data provider to the second data provider for storing or disposing of the plurality of physical objects during the time period.

16. The non-transitory computer-readable medium of claim 14, wherein the first plurality of details comprises a table including at least 500 rows.

17. The non-transitory computer-readable medium of claim 14, further comprising program code that is executable by the one or more processors for causing the one or more processors to:
  determine whether the physical object is described in an object database; and
  in response to determining that the physical object is not described in the object database, flag the entry as involving a fourth type of error that is different from the first, second, and third types of errors.

18. The non-transitory computer-readable medium of claim 14, wherein the graphical user interface is interactive, the graphical user interface being configured to receive a selected time period from a user and responsively indicate which types of errors are present in a plurality of datasets from the first data provider over the selected time period.

19. The non-transitory computer-readable medium of claim 14, further comprising program code that is executable by the one or more processors for causing the one or more processors to:
  determine the target storage classification based on one or more physical characteristics of the physical object.

20. The non-transitory computer-readable medium of claim 14, further comprising program code that is executable by the one or more processors for causing the one or more processors to:
  transmit an electronic communication to the first data provider, the electronic communication being configured to notify the first data provider of the one or more types of errors.

* * * * *